INVENTOR.
ROBERT C. WHEELER
BY
Robert E. Strauss
ATTORNEY

July 28, 1970 R. C. WHEELER 3,522,369

CONTROL PULSE GENERATING CIRCUIT FOR COLOR TELEVISION RECEIVER

Filed May 12, 1967 2 Sheets-Sheet 2

INVENTOR.
ROBERT C. WHEELER

BY

Robert E. Strauss

ATTORNEY

United States Patent Office 3,522,369
Patented July 28, 1970

3,522,369
CONTROL PULSE GENERATING CIRCUIT FOR COLOR TELEVISION RECEIVER

Robert Charles Wheeler, Batavia, N.Y., assignor to Sylvania Electric Products Inc., a corporation of Delaware Filed May 12, 1967, Ser. No. 637,970
Int. Cl. H04n 9/02
U.S. Cl. 178—5.4 5 Claims

ABSTRACT OF THE DISCLOSURE

A single stage pulse generating circuit for the chroma channel of a color television receiver wherein horizontal retrace pulses are applied to the control electrode of an electron discharge device. A pulse taken from the first output electrode of the electron discharge device is applied to the bandpass amplifier of the chroma channel, the pulse being of the proper polarity, shape and magnitude to blank out the bandpass amplifier during horizontal retrace. The pulse taken from the second output electrode is applied to the burst amplifier of the chroma channel to gate on the burst amplifier during the horizontal retrace thereby allowing the amplification and passage of the burst of color synchronizing pulses for further signal processing. The pulse from the second output electrode of the electron discharge device may also be applied to matrix amplifiers in the chroma channel to further assure the blanking of the cathode ray display tube during the retrace cycle.

BACKGROUND OF THE INVENTION

This invention relates generally to television receivers and more particularly to improved control circuitry for use in the chroma channel of color television receivers.

In the color television receiver, after amplification and detection of the composite video signal, the luminance component of the video signal are applied to a luminance channel and the chroma components, including bursts of synchronizing signals at a subcarrier frequency hereafter referred to as a color-burst signals, are applied to a chroma channel for further signal processing. The chroma signal components consist of a subcarrier signal and its sidebands, modulated in phase to represent hue and in amplitude to represent color intensity. In transmission the subcarrier is suppressed to conserve band width, so it is necessary to reinsert a subcarrier at the receiver to permit demodulation of the chroma signal components. Therefore, the color-burst signals are added to the rear pedestal of the transmitted horizontal blanking pulses and are utilized at the receiver to control the frequency and phase of a local oscillator operative to provide the continuous wave subcarrier signals.

In the chroma channel of the receiver, the color-burst signals must be separated from the chroma signal components. The combined signal is applied simultaneously to a burst gate amplifier and a chroma or bandpass amplifier, the burst gate amplifier being biased so that it is normally non-conducting and the bandpass amplifier being biased to be normally conducting. During the time interval when the color-burst signals are present, control pulses are applied simultaneously to the burst gate and chroma amplifiers which are operative to render the burst gate amplifier conducting to thereby pass the color-burst signals and to render the bandpass amplifier non-conducting thereby removing the color-burst signals from the chroma section of the chroma channel. Since the color-burst signals occur in time coincidence with the horizontal retrace pulses, this pulse is used to generate a blanking pulse to cut-off the bandpass amplifier and a gating pulse to render the burst gate amplifier conducting for the desired interval of time. The gating or blanking pulse has also been used to clamp the final color amplifiers in the chroma channel to assure that noise signals do not appear on the display tube during the retrace cycles.

Prior art color television receivers have required separate pulse generating amplifiers to provide the requisite blanking and gating pulses. Generally, the blanking pulse has been somewhat wider than the gating pulse to assure complete blanking during horizontal retrace. The gating pulse was narrower to preclude the possibility of passing part of the chroma signal along with the color-burst signal. However, it has been found in some instances that the blanking pulse also prevents portions of the chroma signal from passing through the bandpass amplifier thereby reducing the amount of color information which reaches the display device. Furthermore, the use of separate pulse generating amplifiers necessarily adds to the cost of the receiver and since differing pulse widths were derived from these amplifiers it is necessary to include additional pulse shaping components requiring separate steps of adjustment and control.

Accordingly, it is an object of this invention to provide improved chroma control circuitry for a color television receiver which overcomes the foregoing disadvantages and deficiencies of prior art circuitry.

Another object of this invention is to provide improved chroma control circuitry of simplified design and reduced costs.

Still another object of this invention is to provide a single stage control pulse generating circuit capable of generating two or more control pulses of different polarity.

SUMMARY OF THE INVENTION

According to one aspect of the invention, a pulse generating circuit has its input electrode connected to a source of horizontal retrace pulses. The pulse generating circuit operates to suitably shape the input pulses and provides at one output electrode control pulses of one polarity and a given amplitude. Pulses of opposite polarity and required amplitude are provided at a second output electrode of the circuit. The pulses at both output electrodes are in time coincidence with the pulses applied to the input of the circuit and the output pulses are suitably applied to the control electrodes of various stages in the chroma channel to accomplish the desired control functions.

DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
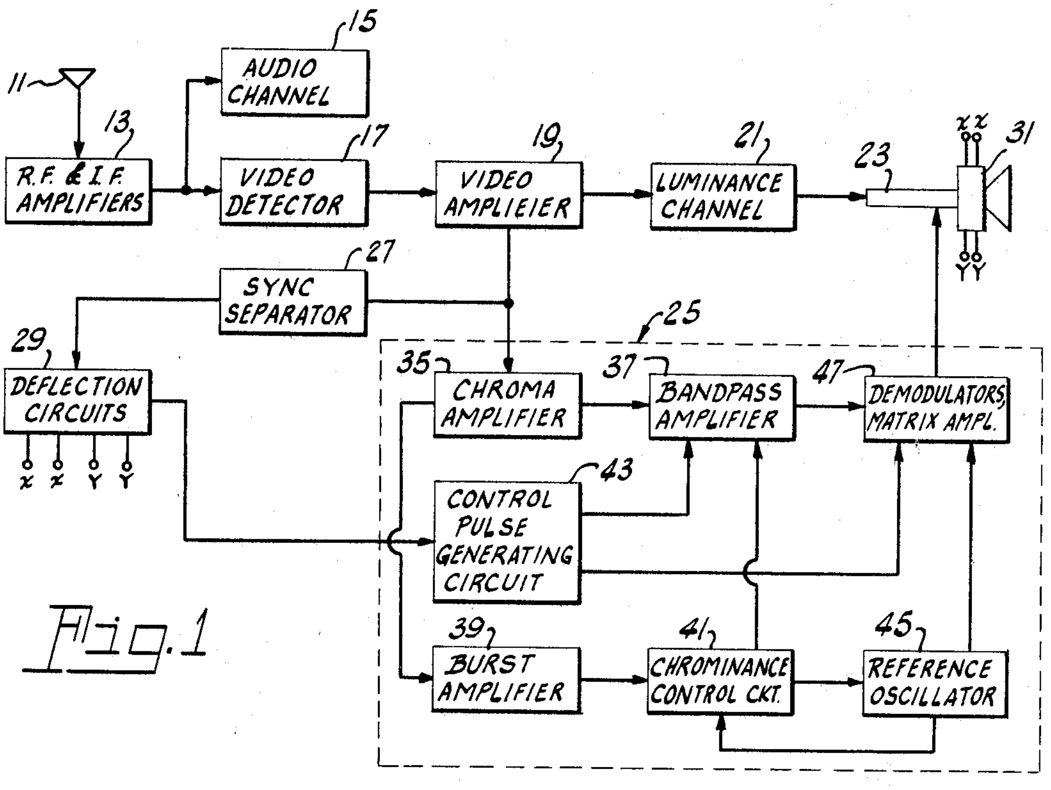
FIG. 1 is a block diagram of a typical color television receiver in which the present invention finds utility.

Referring first to the block diagram of a television receiver shown in FIG. 1 the composite color signal received at the antenna 11 is applied to the RF–IF amplifier 13. The IF output is applied to the audio channel 15 for detection and further processing of the audio signal components, and is also applied to a video detector 17. The output of the video detector goes to a video amplifier 19 where the luminance signal components are separated from the composite signal and applied to the luminance channel 21 for further signal processing. The output of the luminance channel is then applied to the cathode ray display tube 23.

Another output from the video amplifier 19 is applied to the chroma channel 25 and a sync separator circuit 27. The sync separator circuit separates the deflection synchronizing pulses from the remainder of the signal and transfers these pulses to suitable deflection circuits 29. The deflection circuits develop horizontal and vertical deflection signals, X and Y, which are applied to a deflection yoke 31 mounted on a cathode ray tube 23 to accomplish the horizontal and vertical scanning functions required for image reproduction.

The input to the chroma channel 25 includes the chroma signal components and the color-burst signals which are applied to a chroma amplifier 35. One output from the chroma amplifier goes to a bandpass amplifier 37 and a second output is applied to a burst amplifier 39. The bandpass amplifier operates to pass only the chroma signal components which are applied to demodulator and matrix amplifier circuitry 47. The burst amplifier is controlled to pass only the color-burst signal which is applied to chrominance control circuitry 41. The control of the bandpass amplifier 37 and the burst amplifier 39 is accomplished by means of pulses generated by the control pulse circuitry 43 which derives an input signal from the deflection circuits 29. One output from the chrominance control circuits goes to the reference oscillator 45 and an output from the reference oscillator is fed back to the chrominance control circuits, this closed loop system being operative to maintain the signal generated by the reference oscillator in a fixed phase relationship with the received color-burst signals. A second output from the reference oscillator is applied to the demodulators 47 to permit demodulation of the chroma signal components. The demodulator and matrix amplifier circuitry 47 then develops color or color difference signals which are applied to the cathode ray display tube 23. These signals are combined with the luminance signal in the cathode ray display tube in a well known manner to effect a recreation and display of the received color image.

Figure 2:
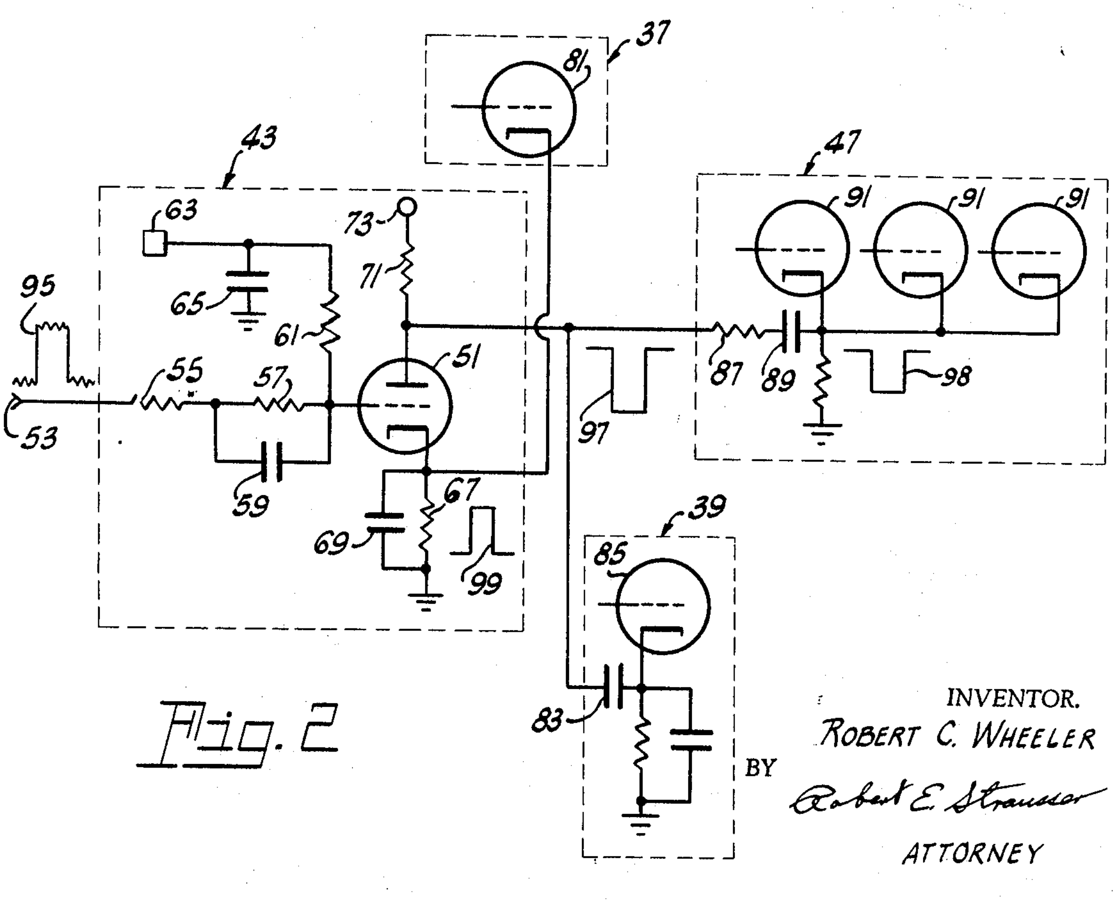
FIG. 2 is a schematic diagram of a control pulse generating circuit according to the present invention.

Referring next to FIG. 2, there is illustrated in schematic form one embodiment of the control pulse circuit 43 according to the present invention and a manner in which the output pulses therefrom may be applied to the various circuits to be controlled. The circuit 43 includes a triode amplifier tube 51, the control grid of which is connected to an input terminal 53 by means of two resistors 55 and 57 in series therebetween. A capacitor 59 is connected in parallel with the resistor 57 and another resistor 61 is connected between the control grid of the tube 51 and a terminal 63. A filter capacitor 65 is connected between the terminal 63 and a point of reference potential such as chassis ground. The cathode of the tube 51 is connected to ground by means of a parallel resistor 67 and capacitor 69 network, and the plate of the tube is connected via a resistor 71 to a source of energizing potential as represented by the terminal 73.

One output taken from the cathode of the tube 51 is connected directly to the cathode of a tube 81 in the bandpass amplifier 37. The output from the plate of the tube 51 is applied to the burst amplifier 39 where it is connected via a capacitor 83 to the cathode of the burst amplifier tube 85. The output from the plate of the tube 51 is also applied to the demodulator and matrix amplifier section 47 where it is connected by a resistor 87 in series with a capacitor 89 to the cathodes of the matrix amplifier tubes 91.

The operation of the control pulse circuit 43 and the associated circuits of FIG. 2 is as follows. During the scan cycle when chroma signal information is present, the bandpass amplifier tube 81 and the matrix amplifier tubes 91 are biased on for normal conduction. The burst amplifier tube 85 and the tube 51 of the pulse shaping circuit 43 are non-conducting. At the end of the scan cycle, the unshaped horizontal retrace pulse 95 is applied to the input 53 and through the control grid network of the tube 51 of the circuit 43. This drives the tube 51 into saturation and causes grid current to flow so that the capacitor 65 acquires a negative charge which permits the terminal 63 to be used as a source of negative voltage elsewhere in the receiver. The heavy conduction of the tube 51 clips the top of the input pulse 95, thereby yielding flat topped pulses 97 and 99 at the plate and cathode, respectively, of the tube 51. The tube grid current results in a clamping action so that the base line of the pulse 95 is driven below the cutoff of the tube so that the pulse 97 at the plate of the tube 51 has a flat base line as well as a flat top. Similarly the pulse 99 across the cathode resistor 67 has a flat base line and a flat top, and is of the same polarity as the input pulse.

The positive pulse 99 when applied to the cathode of the bandpass amplifier tube 81 cuts this tube off, thereby preventing color-burst signals from passing beyond this chroma stage. The negative pulse 97 coupled via the capacitor 83 to the cathode of the burst amplifier tube 85 turns this tube on so that the color-burst signals are amplified and coupled to the succeeding chrominance control circuits 41. The negative pulse 97 coupled to the cathodes of matrix amplifier tubes 91 via the resistor 87 and capacitor 89 operate to clamp these tubes, thereby reducing the plate voltage of the tubes to a level below the cutoff level of the cathode ray display tube 23 so that the display tube is blanked out during the retrace cycle.

Figure 3:
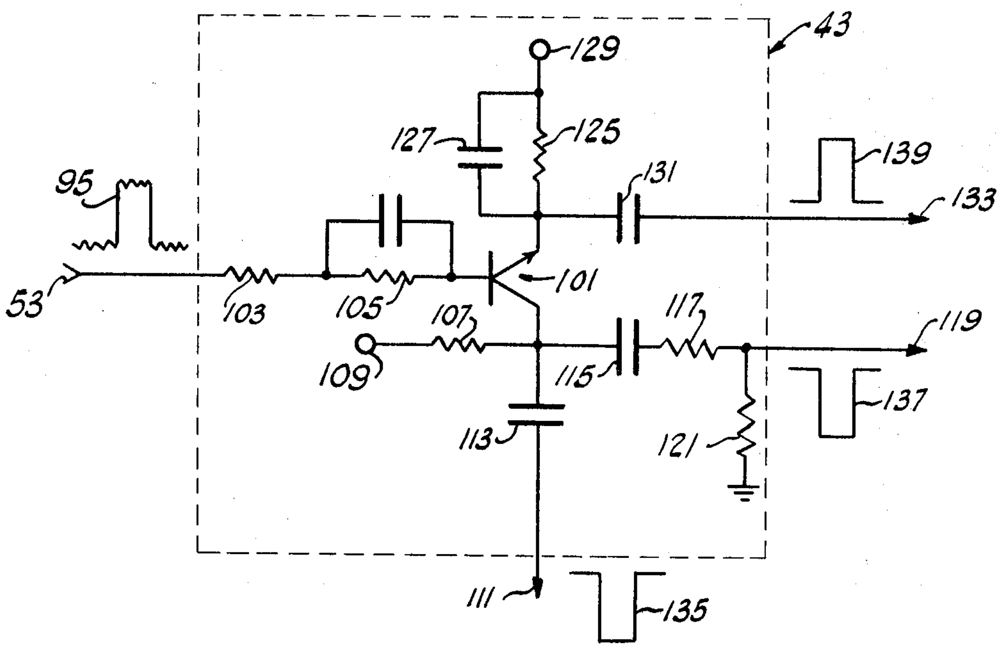
FIG. 3 is a schematic diagram of an alternate embodiment of a control pulse generating circuit according to the present invention.

Referring now to FIG. 3 there is shown a schematic of an alternate embodiment of the control pulse generating circuit 43. Here, the amplifying device is a transistor 101, rather than a vacuum tube. The input terminal 53 applies the unshaped horizontal retrace pulse 95 to the base of the transistor 101 via the resistors 103 and 105. The collector electrode of the transistor is connected by means of a resistor 107 to a source of energizing potential as represented by the terminal 109, and is connected to an output terminal 111 via a capacitor 113. The collector is also connected by a capacitor 115 in series with a resistor 117 to another output terminal 119 having a resistor 121 connected therefrom to ground. The emitter electrode of the transistor 101 is connected by means of a resistor 125 in parallel with a capacitor 127 to a point of reference potential 129 which may, for example, be chassis ground. The emitter electrode is also connected via a capacitor 131 to an output terminal 133.

In operation the circuit of FIG. 3 functions in much the same manner as the circuit of FIG. 2. At the output terminal 133 the pulse 139 is of the same polarity as the input pulse 95. The pulses 135 and 137 at the terminals 111 and 119 are opposite in polarity to the input pulse. Therefore, the circuit of FIG. 3 could replace the circuit of FIG. 2, with terminal 133 going to the cathode of the bandpass amplifier tube 81, terminal 119 going to the cathodes of the matrix amplifier tubes 91 and terminal 111 going to the cathode of the burst amplifier tube 85.

It can readily be seen that the embodiments of FIG. 2 and FIG. 3 can be changed to meet particular design requirements or preference. For example, while the circuits have been shown to provide control at the cathode elements of the stage affected, the circuit could be modified to effect the requisite control at the tube grid electrode, or at the emitter or base electrode of the equivalent transistor circuit.

It is readily apparent that the present invention provides significant advantages not found in prior art circuits. By utilizing a single amplifier stage to generate a plurality of control pulses, it is easier to assure that the control pulses will occur in time coincidence to effect proper control of the receiver. Furthermore, the elimination of a stage of pulse shaping circuitry reduces the component cost of the receiver and enhances its reliability.

While there have been shown and described what are at present considered the preferred embodiments of the invention, it will be obvious to those skilled in the art that various changes and modifications may be made therein without departing from the scope of the invention as defined by the appended claims.

I claim:

1. In a color television receiver including a chroma channel having a bandpass amplifier, matrix amplifier circuitry, and a color-burst amplifier, an improved control pulse generating circuit comprising:
   - an electron device having first, second and control electrodes;
   - means for applying a periodic control pulse to the control electrode of said electron device;
   - means coupling a signal from the first electrode of said electron device to said color-burst amplifier;
   - means coupling a signal from the second electrode of said electron device to said bandpass amplifier; and
   - means coupling a signal from the first electrode of said electron device to said matrix amplifier circuitry.

2. The invention according to claim 1 wherein said electron device having first, second and control electrodes is a transistor having collector, emitter and base electrodes, respectively.

3. The invention according to claim 1, wherein said bandpass amplifier includes a vacuum tube amplifier having a cathode electrode and said means coupling a signal from the second electrode of said electron device to said bandpass amplifier comprises:
   - a resistor connected between the second electrode of said electron device and a point of reference potential;
   - a capacitor connected in parallel with said resistor; and
   - a direct connection from the second electrode of said electron device to the cathode electrode of the vacuum tube amplifier of said bandpass amplifier.

4. The invention according to claim 1, wherein color-burst amplifier includes a multi-grid vacuum tube having a cathode electrode and wherein said means coupling a signal from the first electrode of said electron device to said color-burst amplifier comprises:
   - a resistor and a first capacitor connected in parallel between the cathode electrode of said color-burst amplifier and a point of reference potential; and
   - a second capacitor connected from the first electrode of said electron device to the cathode electrode of said color-burst amplifier.

5. The invention according to claim 1 wherein said matrix amplifier circuitry comprises a plurality of electron discharge devices, each having at least one control electrode and said means coupling a signal from the first electrode of said electron device to said matrix amplifier circuitry comprises:
   - means connecting the control electrodes of said plurality of electron discharge devices together at a common point;
   - a first resistor connected between said common point and ground; and a second resistor and a capacitor connected in series between the first electrode of said electron device and said common point joining the the control electrodes of said plurality of electron discharge devices.

References Cited

UNITED STATES PATENTS

| | | | |
|---|---|---|---|
| 2,894,059 | 7/1959 | Davis. | |
| 2,917,575 | 12/1959 | Hever | 178—5.4 |
| 2,921,123 | 1/1960 | Tarantur. | |
| 2,938,072 | 5/1960 | Macovski | 178—5.4 |
| 2,992,295 | 7/1961 | Quinn et al. | |
| 3,270,127 | 8/1966 | Hansen. | |

RICHARD MURRAY, Primary Examiner